_United States Patent_ [19]

Bannerman et al.

[11] Patent Number: 4,492,729

[45] Date of Patent: Jan. 8, 1985

[54] COHESIVE FIBROUS MAT FOR IN-TRANSIT PARTICULATE CONTROL

[75] Inventors: Wyburn G. Bannerman, Ferndale; Charles H. Ludwig, Waldron Island, both of Wash.

[73] Assignee: Georgia-Pacific Corporation, Atlanta, Ga.

[21] Appl. No.: 433,458

[22] Filed: Oct. 8, 1982

[51] Int. Cl.³ .............................. B32B 5/16
[52] U.S. Cl. ................... 428/283; 428/326; 428/403; 428/535
[58] Field of Search ............ 428/283, 288, 403, 535, 428/326, 478.2, 478.4, 478.8; 220/1.5

[56] References Cited

U.S. PATENT DOCUMENTS

| | | |
|---|---|---|
| 1,902,642 | 3/1933 | Harford . |
| 1,924,194 | 8/1933 | McGurl . |
| 2,116,682 | 5/1938 | Kleinicke et al. . |
| 2,238,776 | 4/1941 | Kleinicke . |
| 3,293,057 | 12/1966 | Rumberger .......................... 428/535 |
| 3,441,959 | 4/1969 | Sears et al. ......................... 428/326 |
| 3,644,171 | 2/1972 | Bevan et al. . |
| 4,169,170 | 9/1979 | Doeksen . |
| 4,214,875 | 7/1980 | Kromrey . |
| 4,259,386 | 3/1981 | Wagstaffe .......................... 428/326 |
| 4,299,877 | 11/1981 | Smart ................................. 428/326 |

FOREIGN PATENT DOCUMENTS 4227 of 1912 United Kingdom .

OTHER PUBLICATIONS

PCT Int'L. Appl. 8001891 Sep., 1981 Stofko et al.
"Papermaking" Pulp and Paper, vol. 11, James P. Case-1, pp.960-961.

Primary Examiner—James J. Bell
Attorney, Agent, or Firm—Banner, Birch, McKie & Beckett

[57] ABSTRACT

Particulate material is protected from dispersion during transportation by a cohesive fibrous mat comprised of the particulate material bound by cellulosic fibrous material and gelantinized starch.

30 Claims, No Drawings

COHESIVE FIBROUS MAT FOR IN-TRANSIT PARTICULATE CONTROL

TECHNICAL FIELD

This invention relates generally to bulk transportation of particulate materials. In particular, this invention relates to the protection of particulate materials (e.g., wood chips) from losses due to wind or motion while being transported in open bulk containers such as railroad cars, trucks or truck trailers.

BACKGROUND OF THE INVENTION

Particulate material, such as wood chips or coal, is often transported in open bulk containers such as railroad cars, trucks and truck trailers. While in motion, significant amounts of particulate material is blown from these open containers. Even when the containers are not in motion, high winds can have the same effect. It is desirable to control this dispersion of the particulate material, including dust and fines, for two reasons. First, significant savings in material could be attained if a cost effective method could be found to prevent or reduce losses of particulate material from open transport containers. Second, many jurisdictions require the control of dust and particulate emissions for environmental or safety reasons.

It is currently the practice to cover open transport containers filled with wood chips, for example, with a net to reduce losses during transport. A primary end use of wood chips transported in bulk is the manufacture of wood pulp. The nets, which are costly, tend to break apart after only a few trips and net pieces entrained in the wood chips have a deleterious effect on the chip handling process. Placing the nets over open transport containers is also time consuming and labor costs are, therefore, high.

Binding particulate material transported in open bulk containers also has been suggested. Many of the binders, however, are expensive petroleum based products such as asphalt, tars, waxes or synthetic polymers. It would be desirable to use a less expensive and renewable resource to provide binders for particulate materials. Furthermore, wood chips used in the pulp industry cannot be bound by petroleum based products because these products are incompatible with pulp manufacturing processes. Even with nonpetroleum based biners, costs are generally too high or the effect too deleterious on pulping to provide a practical alternative to nets.

It would be desirable, therefore, to develop a binder to protect particulate material in transit that is inexpensive, derived from a renewable resource, weather resistant and compatable with wood chips destined for use in the pulping industry.

SUMMARY OF THE INVENTION

It is an object of this invention to provide protection of particulate material from losses due to wind or motion in open bulk transport containers.

It is also an object of this invention to provide a binder which protects particulate material from losses due to wind or motion in open bulk transport containers which is inexpensive and readily available from a renewable resource.

Another object of this invention is to provide a binder for particulate material that is weather resistant.

It is a further object of this invention to provide a method of protecting particulate material from losses due to wind or motion in open bulk transport containers that is less labor intensive than the use of nets.

Still another object of the present invention is to provide an inexpensive binder from readily available materials for the protection of wood chips transported in open bulk transport containers from losses due to wind and motion.

It is yet another object of this invention to provide a binder that protects wood chips from losses due to wind and motion in open bulk transport carriers and that does not have a deleterious effect upon pulping processes.

These and other objects apparent to those skilled in the art are achieved by the embodiments of the present invention set out below.

In one embodiment of the present invention there is provided a protected mass of particulate material comprising a mass of particulate material wherein at least a substantial portion of the exposed surface is a cohesive fibrous mat comprising said particulate material bound by cellulosic fibrous material and gelatinized starch.

In an alternative embodiment of the present invention there is provided a binder composition useful for the protection of particulate materials in transit comprising a mixture of particles of cellulosic fibrous material and gelatinized starch.

In another embodiment of the present invention, a method of protecting a particulate material is provided comprising forming a cohesive fibrous mat on an exposed surface of a mass of particulate material, said cohesive fibrous mat comprising particulate material bound by cellulosic fibrous material and gelatinized starch.

DETAILED DESCRIPTION OF THE INVENTION

The primary components of the binder of the present invention are particles of a fibrous cellulosic material and gelatinized starch. When the binder and water are applied to the surface of a mass of particulate material, such as wood chips, the binder forms a cohesive fibrous mat which protects the particulate material from losses during transport in open containers such as open railroad cars, open trucks and open truck trailers. The cohesive fibrous mat of the present invention is weather resistant and pliable. The primary components are also inexpensive and derived from renewable resources.

Cohesive fibrous mat, as used herein, refers to at least a surface layer of the particulate material bound by particles of cellulosic fibrous material and gelatinized starch.

The cellulosic fibrous material of the present invention functions as an extender for the starch and provides tensil strength. The cellulosic fibrous material is derived from plant material, generally wood. The primary requirement is that the discrete particles of the cellulosic fibrous material employed in the binder be sufficiently fibrous or flocculent to form the cohesive fibrous mat. If wood chips destined to be pulped is the particulate material bound, the cellulosic fibrous material should be compatable with the wood pulping process.

The more coarsely ground the cellulosic fibrous material, the more tensile strength the cohesive fibrous mat or binder will have. The more finely ground the cellulosic fibrous material, the more pliant the cohesive fibrous mat will be because of the increased surface area available to the starch. Consequently, it is desirable to use a mixture of coarsely and finely ground cellulosic fibrous material or a cellulosic fibrous material which contains a range of fiber sizes. In general, by coarsely ground we mean that a substantial portion of the material is retained on a 30 mesh Tyler screen. By finely ground we mean that a substantial portion of the material passes through an 80 mesh Tyler screen. Examples of sources of cellulosic fibrous material include, but are not limited to, sawdust, ground bark, particleboard furnish, pulp mill settling pond sludge, ground paper, ground newsprint, ground paperboard, hogged corrugated clippings, and ground pulps such as groundwood, sulfite, kraft, chemimechanical and thermomechanical pulps. An example of a finely ground cellulosic fibrous material which increases the flexibility of the cohesive fibrous mat is finely ground cellulose produced by processing wood pulp through a comminution device such as a hammer mill.

Although a wide variety of cellulosic fibrous materials can be employed in the present invention, certain cellulosic fibrous materials may be desirable in particular circumstances. Ground newsprint, for example, is an excellent source of cellulosic fiber because it is inexpensive and available in virtually any geographic region. If it is desirable to reduce the amount of gelatinized starch, coarsely ground sulfite pulp, can be used with either groundwood, chemimechanical or thermomechanical pulp. Coarsely ground sulfite pulp is an excellent source of long fibers. Groundwood, chemimechanical or thermomechanical pulps provide hemicellulose which can serve as an adhesive in place of a portion of the gelatinized starch.

Gelatinized starch is another element of the binder. It is the adhesive that binds the cellulosic fibrous material and the particulate material. Any source of starch (e.g., corn, tapioca, potato, etc.) can be employed in the present invention so long as it is gelatinized. Cationic gelatinized potato starch, however, is especially efficient for two reasons. First, gelatinized potato starch has larger molecules thus bridging greater distances. Second, a cationic charge improves adhesion to both the cellulosic fibrous material and the particulate material. As a result, less gelatinized starch is required when cationic gelatinized potato starch is chosen. Potato starch is also generally less expensive. An example of such a starch is STA-LOCK ®442, a cationically charged precooked potato starch available commercially from A. E. Staley Manufacturing Co., Decatur, Ill.

In addition to the cellulosic fibrous material and gelatinized starch, other additives may be included in the binder to form a cohesive fibrous mat. If it is desired to increase water resistance, for example, long chain, water soluble polymers, such as hydroxyethylcellulose, carboxymethylcellulose, methylcellulose or polyvinyl alcohol, may be added. Small amounts of such polymers, however, significantly increase the viscosity of the slurries of cellulosic fibrous material and gelatinized starch requiring a substantial increase in the water content of the slurry. This disadvantage, in addition to the expense of such polymers, makes it desirable to avoid their use. Plasticizers such as glycerol and ethylene glycol can also be employed in binder compositions if brittleness is a problem. It is preferable to avoid the expense of plasticizers if possible by adjusting the amount of finely ground cellulosic fibrous material in the mat. It may be difficult, however, to maintain flexibility of the cohesive fibrous mat in hot, dry weather. A plasticizer should then be employed if increasing the thickness of the cohesive fibrous mat is not sufficient to protect the particulate material. It is important, however, that when the particulate material is wood chips destined for pulping that additives employed are compatable with pulping processes.

In another embodiment of this invention, the amount of gelatinized starch employed can be reduced by employing spent sulfite liquor (SSL) and a resin that is water stable, pulp-process compatible and polymerizable at ambient temperatures. Urea-formaldehyde resins are preferred. In this embodiment, a slurry of water, cellulosic fibrous material, SSL and starch is spread over the particulate material and then sufficient resin is sprayed on the slurry layer to form a cohesive fibrous mat. Lignosulfonate in the SSL combines with the resin to replace a portion of the gelatinized starch binder. Spent sulfite liquor, which has a pH of about 3 to 4, also serves as the catalyst for setting the urea-formaldehyde resin.

The exact proportions of cellulosic fibrous material, gelatinized starch and other ingredients can vary widely depending upon several factors. The cellulosic fibrous material employed, including its flocculence, degree of comminution and hemicellulose content, will significantly affect the amount of starch required. The particular gelatinized starch employed will also affect the overall formulation. As noted above, cationic gelatinized potato starch is a more efficient adhesive than, for example, gelatinized corn starch. The particulate material and the conditions it will be subjected to will also significantly influence formulations of fibrous material and starch as well as the use of additives. One of the primary features of the present invention, however, is that once the cellulosic fibrous material and the starch to be employed are identified (based upon physical properties, cost, availability, etc.), it is simple process for one skilled in the art to establish a preferred formulation suitable to the conditions to which the binder will be subjected.

A cohesive fibrous mat can be formed on a mass of particulate material by one of several methods. In the first method of forming the cohesive fibrous mat, the cellulosic fibrous material, gelatinized starch, and any other dry additives are thoroughly mixed. The dry mix is then spread evenly across the exposed surface of particulate material and then sprayed with water. The exposed surface of particulate material also may be sprayed with water prior to spreading the dry mix. When spreading the dry mix with, for example, blowers, it has been found that maintaining a high moisture content in the cellulosic fibrous material reduces dusting raised from the dry mix. Too high a moisture content, however, will cause the starch to form clumps or balls.

The dry mix can also be wetted thoroughly with water simultaneous to the spreading operation. A simple apparatus was devised for simultaneously blowing and wetting the dry mix. A Sears & Roebuck variable speed blower was fitted with a five-gallon dry mix reservoir made from a polyethylene carboy. The carboy was connected by a venturi to the blower end of the blower tube. A garden hose with a variable nozzle was mounted at the opposite end of the blower tube. The apparatus was found to be suitable to apply the binder as described above.

In another method, the binder is applied as a slurry. First, a dry mix of the cellulosic fibrous material, gelatinized starch, and other additives is prepared. Dry mixing the gelatinized starch with the cellullosic fibrous material aids the subsequent dispersion of the starch in the water. Sufficient water is added to the dry mix to form a sprayable slurry which is then sprayed over the exposed surface of the particulate material. If the SSL-resin mode of the present invention is employed, the SSL solids can be added to either the dry mix, the mix water or the slurry prior to spraying the slurry over the particulate material. The urea-formaldehyde resin can then be sprayed over the applied slurry. The slurry method is preferred since it is less labor-intensive than the dry mix method thus reducing costs.

The amount of binder (i.e., the thickness of the cohesive fibrous mat) required on a transport container will depend upon the tensile strength and cohesiveness of the binder. The cohesiveness and strength will in turn depend on the fineness of the fibrous cellulosic material and the particular gelatinized starch employed. Another significant factor is the conditions to which the particulate material will be subjected. It is preferred, because of costs, to use the minimum amount of binder necessary to protect the particulate material. Generally, depending upon the type of cellulosic fibrous material employed and weather conditions, a minimum of from about 2.5 to about 10 pounds of the cellulosic fibrous material per 100 sq. ft. of exposed particulate material is sufficient. More or less, of course, can be employed depending upon the severity of the conditions encountered.

When gelatinized starch is the only adhesive in the binder, the quantity of starch required will depend on the particulate material being coated, the type of starch employed and the conditions that will be encountered (weather, rail bed, tunnels, speeds, etc.). For example, as little as about 1.2 pounds of gelatinized cationic potato starch per 100 sq. ft. of exposed particulate material may be sufficient in an open rail car. Larger amounts of starch provide stronger mats, of course, but economic factors encourage the use of minimal amounts of starch. Generally, a minimum of about 1.7 pounds of cationic potato starch or about 3.3 pounds of gelatinized corn starch per 100 sq. ft. provide adequate protection at reasonable costs. Severe conditions, however, may require more, just as mild conditions may allow less to be used. The required quantity of starch can be further reduced to about one-half or less of the above-named levels if a second adhesive, such as a urea-formaldehyde resin, is used in conjunction with the starch-cellulosic fiber composition.

When forming the cohesive fibrous mat or particulate material in open transport containers, it is preferable that the exposed surface of the particulate material be either level or gently convex. Vertical or nearly vertical exposed surfaces should be avoided since these will have a tendency to collapse or slide and fracture the cohesive fibrous mat.

The cohesive fibrous mat of the present invention is weather resistant and can be formed under adverse weather conditions. For example, when temperatures are below freezing, the freshly applied binder can freeze over the mass of particulate material in an open transport container. In the frozen state, no particulate material will be blown from the railroad car. If the temperature rises and the binder begins to thaw, it will set and become tacky, protecting the particulate material. As it dries, the mat will harden and continue to protect the particulate material. If a dried cohesive fibrous mat is subjected to rain, it will soften and become tacky again, still protecting the particulate material. In addition, wet particulate material, such as wood chips, will be generally more difficult to blow from open transport containers. As the wood chips dry, the mat rehardens so that the wood chips are still protected.

The following examples are included for illustrative purposes only and are in no way intended to limit the scope of the invention.

EXAMPLE 1

An example of a formulation for a cohesive fibrous mat from particleboard furnish and pregelatinized starch would be:

| INGREDIENTS | OPERATIVE RANGE* | PREFERRED RANGE* |
|---|---|---|
| particle board furnish (by dry weight) | 1–3 | 1.7–1.9 |
| gelatinized corn starch | 1 | 1 |

*Parts by weight.

A dry mix according to the above formulation can either be spread over a particulate material and thoroughly wetted, or slurried and then spread over a particulate material and allowed to dry.

EXAMPLE 2

Cohesive fibrous mats which employ coarsely ground cellulosic fibrous material and finely ground cellulose can be made from the following formulation:

| INGREDIENTS | OPERATIVE RANGE* | PREFERRED RANGE* |
|---|---|---|
| particleboard furnish (by dry weight) | 100 | 100 |
| finely ground cellulose | 17–34 | 23–27 |
| gelatinized corn starch | 25–42 | 31–35 |

*Parts by weight.

The above formulation can be applied as in Example 1. CELLUFLOC®, a finely ground cellulose available from the Georgia-Pacific Corporation was employed. The corn starch was PRE-GEL®, a pregelatinized corn starch available from Hubinger Co., Emeryville, Calif.

EXAMPLE 3

Railroad cars loaded no higher than 1 foot above the top of the car with wood chips (ca 600 sq. ft. surface area) were coated with the following formulations:

| A | |
|---|---|
| sawdust | 60.0 lbs. |
| finely ground cellulose | 14.0 lbs. |
| gelatinized corn starch | 21.0 lbs. |
| B | |
| sawdust | 60.0 lbs. |
| finely ground cellulose | 12.0 lbs. |
| gelatinized corn starch | 18.0 lbs. |
| C | |
| sawdust | 60.0 lbs. |
| finely ground cellulose | 10.0 lbs. |
| gelatinized corn starch | 15.0 lbs. |

The finely ground cellulose was CELLUFLOC®, and the gelatinized corn starch was PRE-GEL®, as in Example 2.

One car was totally coated with formulation A. One half of a second car was coated with 50% of binder B and the other half was coated with 50% of binder C. In addition, three cardboard boxes filled with wood chips were also coated with the above formulations at the same time the railroad cars were coated. The coatings were applied in the rain as a dry mix and then thoroughly wetted with a water spray. Some starch was lost due to blowing during the applications. The railcars travelled for approximately 225 miles over a time period of approximately 2½ to 3 days during rainy weather. Upon arrival at their destination, the coatings all had a good appearance and were soft and pliant. There was minimal exposed area due to settling and cracking. The cohesive fibrous mats were not dry and no substantial difference could be detected between formulations A, B and C. An examination of the cardboard boxes of wood chips, which were kept indoors, revealed that formulations A and B produced a very strong cohesive fibrous mat and that formulation C produced a cohesive fibrous mat which was not as strong and showed signs of being slightly brittle.

EXAMPLE 4

Slurries containing small amounts of high surface area (i.e., finely ground) cellulosic fiber that can be spray coated over an open railroad car or truck with approximately 600 sq. ft. of exposed surface were prepared using the following formulations:

| A | |
|---|---|
| coarsely ground sulfite pulp | 12.5 lbs. |
| finely ground cellulose | 7.5 lbs. |
| gelatinized corn starch | 20.0 lbs. |
| water | 800 lbs. |
| B | |
| coarsely ground sulfite pulp | 12.5 lbs. |
| finely ground cellulose | 7.5 lbs. |
| cationic gelatinized potato starch | 10.0 lbs. |
| water | 900 lbs. |
| C | |
| ground newsprint | 20.0 lbs. |
| gelatinized corn starch | 20.0 lbs. |
| water | 1100 lbs. |
| D | |
| ground newsprint | 15.0 lbs. |
| finely ground cellulose | 5.0 lbs. |
| cationic gelatinized potato starch | 12.5 lbs. |
| water | 1100 lbs. |
| E | |
| coarsely ground sulfite pulp | 12.0 lbs. |
| finely ground cellulose | 7.5 lbs. |
| cationic gelatinized potato starch | 5.0 lbs. |
| spent sulfite liquor (50% T.S.) | 40.0 lbs. |
| water | 800 lbs. |
| urea-formaldehyde resin | 50.0 lbs. |

In the above formulations, finely ground cellulose or ground newsprint was first premixed dry with the gelatinized starch to aid dispersion of the starch into the cold water. The finely ground cellulose employed was CELLUFLOC ®, the cationic gelatinized potato starch was STA-LOK ®, and the corn starch employed was PRE-GEL ®. In formulation E the wood pulp, ground cellulose, gelatinized starch, spent sulfite liquor and water were first slurried and then sprayed on wood chips in an open rail car. The urea-formaldehyde resin was then applied in a second spraying. The urea-formaldehyde resin was U.F. Resin 212 available from the Georgia-Pacific Corporation.

Other embodiments of the present invention will be readily apparent to those in the art. It is intended, therefore, that the scope of the invention be limited only by the following claims.

We claim:

1. A protected mass of wood chips comprising a mass of wood chips wherein at least a substantial portion of the exposed surface is a cohesive fibrous mat comprising said wood chips bound by cellulosic fibrous material and gelatinized starch, said cohesive fibrous mat being essentially only on the surface of said mass of wood chips.

2. The protected mass of claim 1 wherein said cellulosic fibrous material is selected from the group consisting of sawdust, ground bark, particleboard furnish, pulp mill settling pond sludge, ground paper, ground newsprint, ground paperboard, hogged corrugated clippings and ground pulp.

3. The protected mass of claim 2 wherein said cellulosic fibrous material is ground newsprint.

4. The protected mass of claim 2 wherein said cellulosic fibrous material is a mixture of finely ground cellulosic material and coarsely ground cellulosic material.

5. The protected mass of claim 4 wherein said coarsely ground cellulosic material is selected from the group consisting of ground pulp, sawdust, ground bark, particleboard furnish, ground paper, ground newsprint, ground paperboard, and hogged corrugated clippings.

6. The protected mass of claim 2 wherein said cellulosic fibrous material is a mixture comprising ground sulfite pulp and at least one groundwood pulp selected from the group consisting of ground pulp, chemimechanical pulp and thermomechanical pulp.

7. The protected mass of claim 2 wherein said gelatinized starch is selected from the group consisting of gelatinized potato starch and gelatinized corn starch.

8. The protected mass of claim 2 wherein said gelatinized starch is cationic gelatinized potato starch.

9. The protected mass of claim 3 wherein said gelatinized starch is cationic gelatinized potato starch.

10. The protected mass of claim 1 wherein said mass of wood chips is contained in an open transport container selected from the group consisting of open railroad cars, open trucks and open truck trailers.

11. The protected mass of claim 2 wherein said mass of wood chips is contained in an open transport container selected from the group consisting of open railroad cars, open trucks and open truck trailers.

12. The protected mass of claim 8 wherein said mass of wood chips is contained in an open transport container selected from the group consisting of open railroad cars, open trucks and open truck trailers.

13. The protected mass of claim 9 wherein said mass of wood chips is contained in an open transport container selected from the group consisting of open railroad cars, open trucks and open truck trailers.

14. A method of protecting a mass of wood chips comprising:
providing a binder composition comprising discrete particles of cellulosic fibrous material and gelantized starch; and
applying said binder composition to the exposed surfaces of the mass of wood chips and contacting said binder composition with water to form a cohesive fibrous mat of wood chips bound by said binder composition, said cohesive fibrous mat being essentially only on the surface of the mass of wood chips.

15. The method of claim 14 wherein said cellulosic fibrous material is selected from the group consisting of sawdust, ground bark, particleboard furnish, pulp mill settling pond sludge, ground paper, ground newsprint, ground paperboard, hogged corrugated clippings and ground pulp.

16. The method of claim 15 wherein said cellulosic fibrous material is ground newsprint.

17. The method of claim 15 wherein said cellulosic fibrous material is a mixture of finely ground cellulosic material and coarsely ground cellulosic material.

18. The method of claim 17 wherein said coarsely ground cellulosic material is selected from the group consisting of ground pulp, sawdust, ground bark, particleboard furnish, ground paper, ground newsprint, ground paperboard, and hogged corrugated clippings.

19. The method of claim 15 wherein said cellulosic fibrous material is a mixture comprised of ground sulfite pulp and at least one ground pulp selected from the group consisting of groundwood pulp, chemimechanical pulp and thermomechanical pulp.

20. The method of claim 15 wherein the gelatinized starch is selected from the group consisting of gelatinized corn starch and gelatinized potato starch.

21. The method of claim 15 wherein said gelatinized starch is cationic gelatinized potato starch.

22. The method of claim 16 wherein said starch is cationic gelatinized potato starch.

23. The method of claim 15 wherein said cohesive fibrous mat is formed by spraying an aqueous slurry of said cellulosic fibrous material and said starch over said exposed surface.

24. The method of claim 23 wherein said aqueous slurry further comprises spent sulfite liquor and further comprising the step of spraying a urea-formaldehyde resin over said slurry after said slurry has been sprayed over said exposed surface.

25. The method of claim 15 wherein said cohesive fibrous mat is formed by spreading a binder composition over said exposed surface and wetting said exposed surface covered with said binder composition, said binder composition comprising said cellulosic fibrous material and said gelatinized starch.

26. The method of claim 15 wherein said cohesive fibrous mat is formed by simultaneously blowing a binder composition and spraying water over said exposed surface, said binder composition comprising said cellulosic fibrous material and said gelatinized starch.

27. The method of claim 14 wherein said mass of wood chips is contained in an open transport container selected from the group consisting of open railroad cars, open trucks and open truck trailers.

28. The method of claim 15 wherein said mass of wood chips is contained in an open transport container selected from the group consisting of open railroad cars, open trucks and open truck trailers.

29. The method of claim 21 wherein said mass of wood chips is contained in an open transport container selected from the group consisting of open railroad cars, open trucks and open truck trailers.

30. The method of claim 22 wherein said mass of wood chips is contained in an open transport container selected from the group consisting of open railroad cars, open trucks and open truck trailers.

* * * * *